United States Patent
Melde-Tuczai et al.

(10) Patent No.: US 8,667,943 B2
(45) Date of Patent: Mar. 11, 2014

(54) INTERNAL COMBUSTION ENGINE HAVING A CYLINDER HEAD AND A CYLINDER BLOCK

(75) Inventors: Helmut Melde-Tuczai, Graz (AT); Christof Knollmayr, Graz (AT); Andreas Zurk, Weinburg (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/512,644

(22) PCT Filed: Nov. 25, 2010

(86) PCT No.: PCT/EP2010/068200
§ 371 (c)(1),
(2), (4) Date: Jun. 18, 2012

(87) PCT Pub. No.: WO2011/067159
PCT Pub. Date: Jun. 9, 2011

(65) Prior Publication Data
US 2012/0260880 A1    Oct. 18, 2012

(30) Foreign Application Priority Data
Dec. 3, 2009   (AT) .................................. 1921/2009

(51) Int. Cl.
*F02B 75/06*  (2006.01)
(52) U.S. Cl.
USPC ..................................................... 123/192.2
(58) Field of Classification Search
USPC .................................................... 123/192.2
See application file for complete search history.

(56) References Cited

U.S. PATENT DOCUMENTS

| | | | |
|---|---|---|---|
| 3,961,614 A * | 6/1976 | Rameau | 123/195 A |
| 3,983,852 A | 10/1976 | Chatourel | |
| 4,177,773 A | 12/1979 | Cribbs | |
| 6,330,871 B1 * | 12/2001 | Jufuku et al. | 123/193.3 |
| 7,808,347 B2 | 10/2010 | Song | |
| 2008/0092389 A1 | 4/2008 | Neitz et al. | |
| 2008/0110331 A1 * | 5/2008 | Bickle et al. | 92/129 |

FOREIGN PATENT DOCUMENTS

| | | |
|---|---|---|
| DE | 2444659 | 7/1975 |
| GB | 2425570 | 11/2006 |
| JP | 3185220 | 8/1991 |

OTHER PUBLICATIONS

English Abstract of JP 3185220.

* cited by examiner

*Primary Examiner* — Lindsay Low
*Assistant Examiner* — Charles Brauch
(74) *Attorney, Agent, or Firm* — Dykema Gossett PLLC

(57) ABSTRACT

An internal combustion engine (1), including a cylinder head (2) and a cylinder block (3), with a crankcase (10) being fixed to the cylinder block (3), and with at least one mass balancing shaft (20) being held in the crankcase (10). In order to reduce the production effort it is provided that—when seen in the direction of the axis (19a) of the crankshaft (19)—a first pin (26) which is arranged in a borehole (6) and arranged as an alignment pin is positioned in the region of the face side (5) of the crankcase (10) on a straight connecting line (27) between the axis (20a) of the mass balancing shaft (20) and the axis (19a) of the crankshaft (19), with preferably the first pin (26) being arranged in the crankcase (10) and the borehole (6) in the flanged bush (24).

6 Claims, 6 Drawing Sheets

INTERNAL COMBUSTION ENGINE HAVING A CYLINDER HEAD AND A CYLINDER BLOCK

BACKGROUND OF THE INVENTION

1. Field of the Invention

The invention relates to an internal combustion engine which includes a cylinder head and a cylinder block, with a crankcase being fixed to the cylinder block, and with at least one mass balancing shaft being held in the crankcase, with at least one bearing bore for the mass balancing shaft being formed by a flanged bush which is fixed in the region of a face side of the crankcase, especially screwed onto the same.

2. The Prior Art

It is known to arrange the cylinder head and the cylinder block as a unit. Such head-cylinder-block units are also known as monoblocs. An integral crankcase is usually adjacent to the head-block unit. Furthermore, internal combustion engines with multi-part crankcases are known, with one crankcase part and bearing bracket for the crankshaft bearing being cast together into one piece. This component is also known as "bed plate". In the case of monobloc internal combustion engines, individual bearing blocks with individual bearing brackets were used up until now in order to enable the necessary accessibility for machining the cylinder bores.

An internal combustion engine with cylinder head and cylinder block is known from GB 2 425 570 B, with the cylinder head and the cylinder block being integrally arranged.

An internal combustion engine with a crankcase structure is known from JP 3-185220 A, in which a mass balancing shaft is held in a flanged bush. The integral mass balancing shaft is inserted through an opening on the face side. The diameter of the flange is larger than the diameter of the weights of the mass balancing shaft. A similar arrangement is known from US 2007/261657 A.

It is known to hold mass balancing shafts in the crankcase. In particular in the case of monobloc internal combustion engines it is relatively difficult to machine the bearing of the mass balancing shaft in the head-block unit or in the crankcase.

It is the object of the invention to reduce the amount of machining work in an internal combustion engine of the kind mentioned above.

SUMMARY OF THE INVENTION

This is achieved in accordance with the invention in such a way that—when seen in the direction of the axis of the crankshaft—a first pin which is arranged in a borehole and as an alignment pin is positioned in the region of the face side of the crankcase on a straight connecting line between the axis of the mass balancing shaft and the axis of the crankshaft, with preferably the first pin being arranged in the crankcase and the borehole in the flanged bush.

The first pin therefore holds the necessary distance for the engagement of the gearwheels for driving the mass balancing shaft. The machining of the surface for fixing the flanged bushes in the bottom part of the crankcase can occur from the outside. The head-block unit comprises a cast recess for accommodating the flanged bushes.

In order to ensure the parallelism of the mass balancing shaft in relation to the crankshaft, it is especially advantageous when one respective second pin is arranged in the region of one respective face side of the crankcase, which pin comprises two flattened portions which are aligned parallel to the connecting line between the axis of the crankshaft and the axis of the mass balancing shaft, and which pin is respectively guided in a respective guide opening of a corresponding part, with preferably the second pin respectively being arranged in a face wall of the crankcase and the guide opening in the respective flanged bush. The two flattened portions are positioned parallel to the connecting line between the axis of the crankshaft and the axis of the mass balancing shaft. The flanged bushes can therefore be pivoted about the first pin without leading to disadvantages for the toothed engagement of the two gearwheels.

This arrangement allows machining the receiving boreholes for the main bearings of the crankshaft and the bearing bores in the flanged bushes independent from the head-block unit in one clamping.

Preferably, the bearing bores of the balancing shaft are formed by the flanged bushes.

It is especially advantageous when the crankcase consists of a first part adjacent to the head-block unit and a second part adjacent to the first part, with the first and second part being divided in a plane containing the axis of the crankshaft, preferably normally to the cylinder axes, with preferably the first and/or second part forming at least one main bearing for the crankshaft.

The cylinder liners can either be incorporated integrally into the head-block unit, or they can be screwed into the same.

It is further provided within the scope of the invention that at least one mass balancing shaft is held in the first part. The position of the mass balancing shaft is found in such a way that the weights of the shaft are able to rotate with sufficient distance from the envelope of the connecting rod, with the axis of the mass balancing shaft not having to lie in the plane of the axis of the crankshaft.

Since the bearing bores for the mass balancing shaft are formed by flanged bushes, it is ensured that the machining of the bearing bores for the mass balance shaft can only occur in the crankcase and need not occur together with the head-block unit. The flanged bushes are fixed in this process with the screws in the above first part of the crankcase.

It can be provided in a further embodiment of the invention that the mass balancing shaft comprises at least one cam for driving an injection pump. This allows driving the injection pump by the balancing shaft. The position of the cam can be chosen at will and can also be arranged for example in the vicinity of the bearing of the mass balancing shaft on the side of the flywheel.

BRIEF DESCRIPTION OF THE DRAWINGS

The invention will be explained below in greater detail by reference to the drawings, wherein.

DETAILED DESCRIPTION OF THE PREFERRED EMBODIMENT

Figure 1:
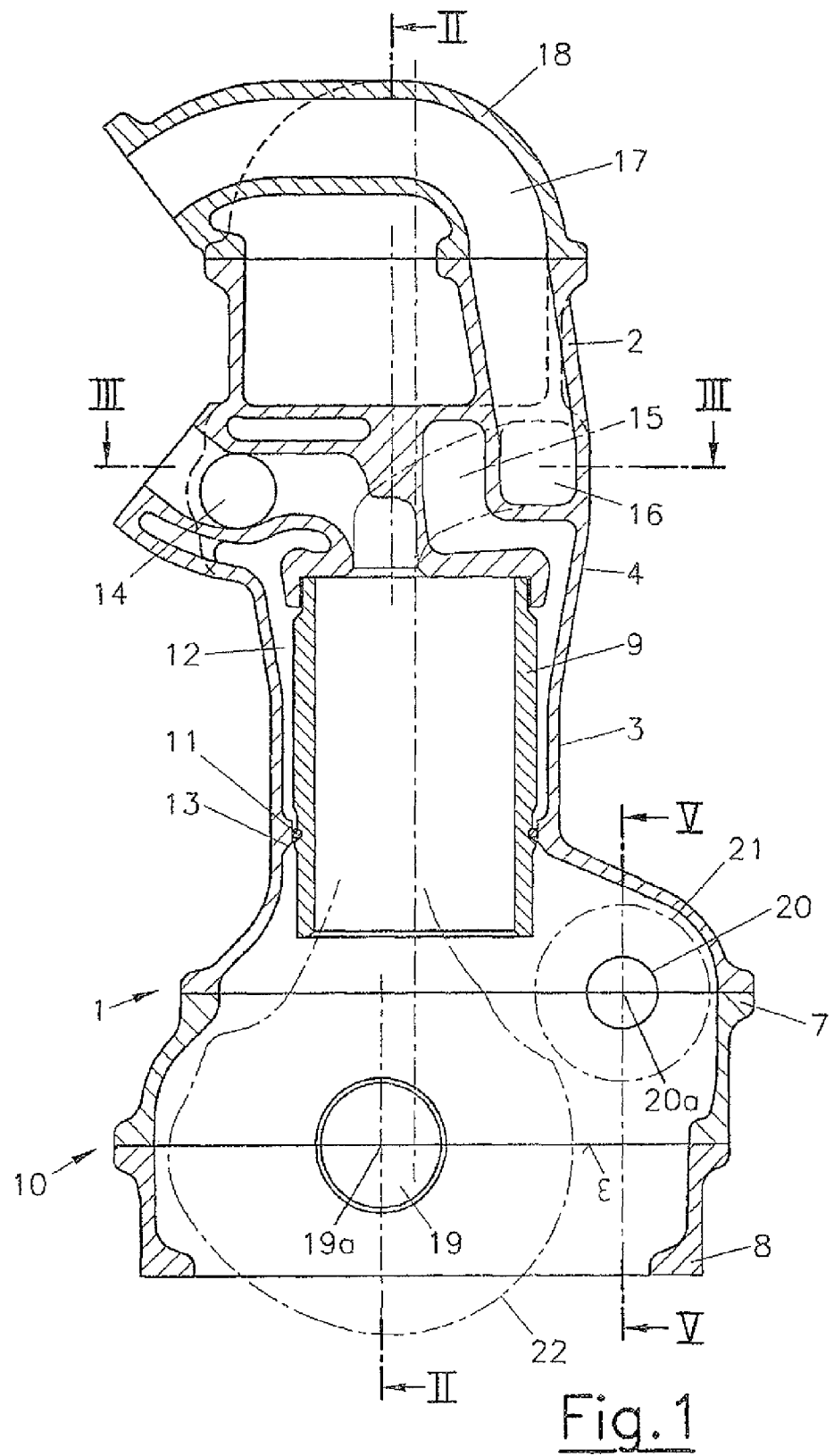
FIG. 1 shows an internal combustion engine in accordance with the invention in a sectional view along the line I-I in FIG. 2.
Figure 2:
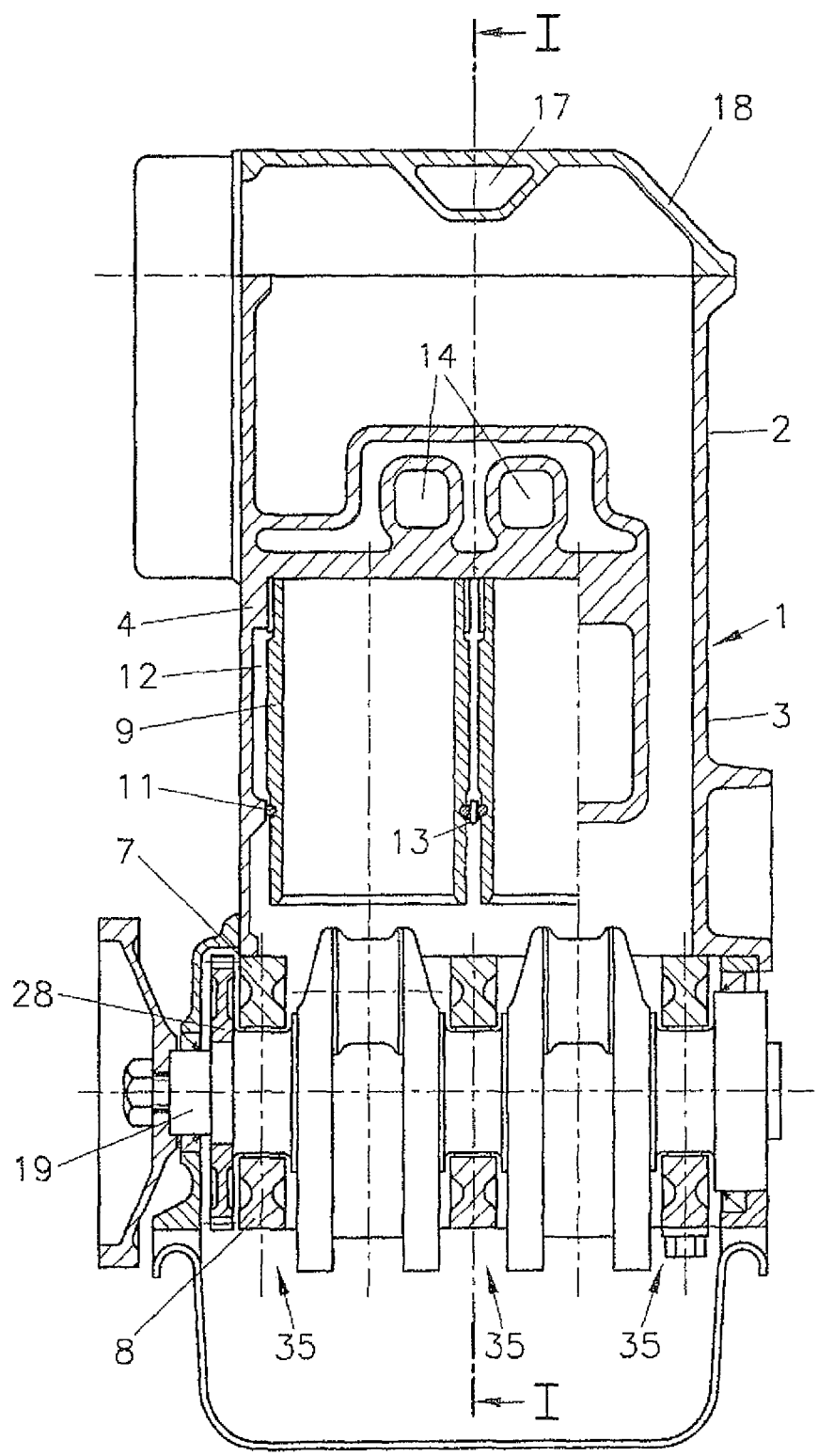
FIG. 2 shows the internal combustion engine in a sectional view along the line II-II in FIG. 1.
Figure 3:
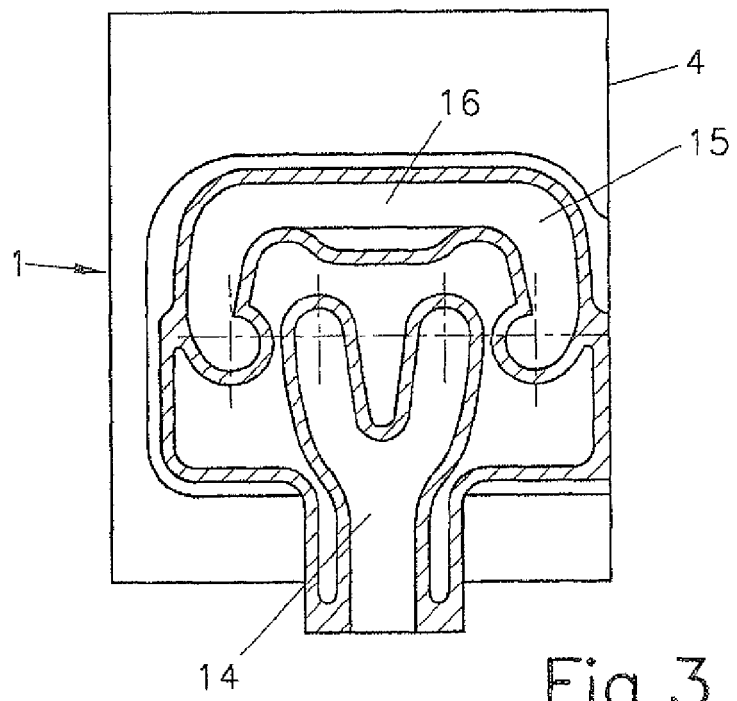
FIG. 3 shows the internal combustion engine in a sectional view along the line III-III in FIG. 1.
Figure 4:
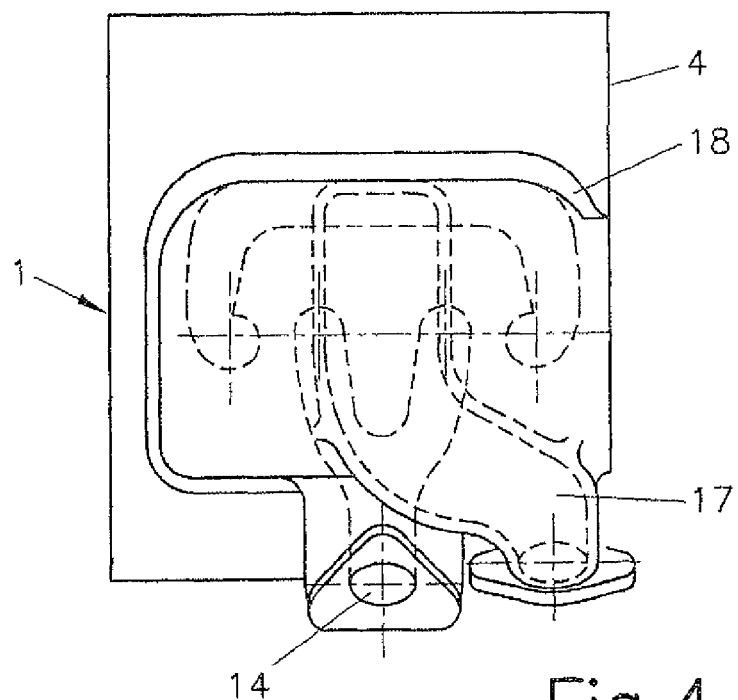
FIG. 4 shows the internal combustion engine in a top view.

FIGS. 1 to 4 show an internal combustion engine 1 with a cylinder head 2 and a cylinder block 3, with the cylinder head 2 and the cylinder block 3 being arranged in an integral fashion to form a head-block unit 4. A crankcase 10 is adjacent to the head-block unit 4, which crankcase consists of an upper first part 7 and a bottom second part 8. The cylinder liners 9 are screwed into the head-block unit 4. It is also possible alternatively to arrange the cylinder liners 9 integrally with the head-block unit 4.

The head-block unit 4, the first part 7 and the second part 8 of the crankcase 10 can consist of different materials. An especially light crankcase 10 can be realized when all components are made of light metal. It is alternatively also possible to make the head-block unit 4 and the first part 7 of light metal, and to make the cylinder liners 9 and the highly loaded second part 8 of gray cast iron. The distance between the individual cylinders arises from the condition that a complete mounting chamfer 13 needs to be arranged for the O-ring seal 11 of the cooling water chamber 12. In the case of the integral cylinder liner, the cylinder distance will become smaller. The two-part crankcase 10 can accommodate at least one mass balancing shaft 20, at least one injection-pump drive shaft and/or at least one oil pump 30.

As is shown in FIGS. 1 to 4, the outlet lines 14 can be integrated in the head-block unit 4. Furthermore, the inlet lines 15 and the inlet collector 16 can also be integrated partly in the head-block unit 4. Especially in the case of a gasoline engine, long feed lines 17 ("ram pipes") can be housed in the cylinder head cover 18 and the head-block unit 4. The inlet collector 16 lies in this case at a lower position.

Figure 5:
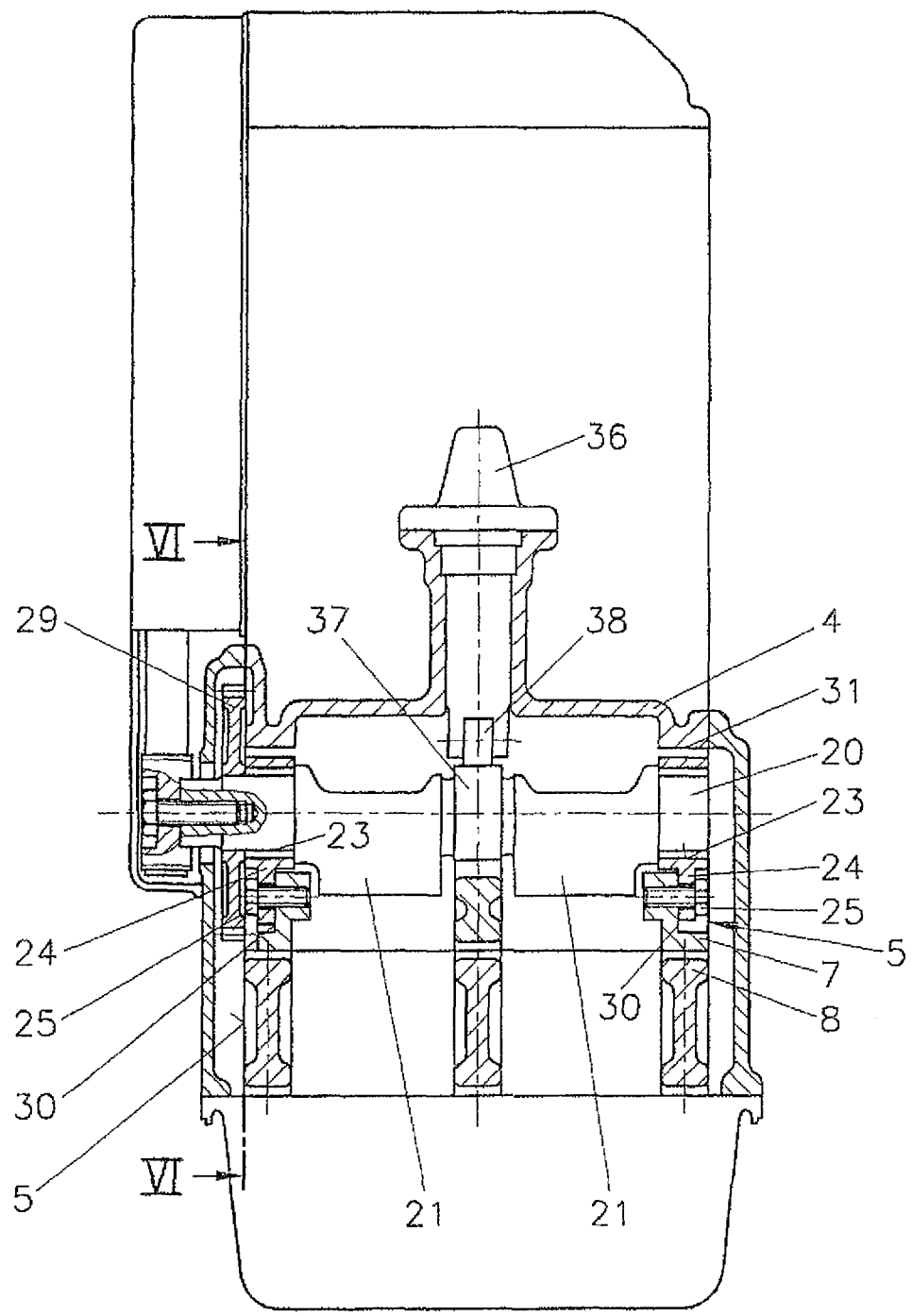
FIG. 5 shows the internal combustion engine in accordance with the invention in a sectional view along the line V-V in FIG. 1.
Figure 6:
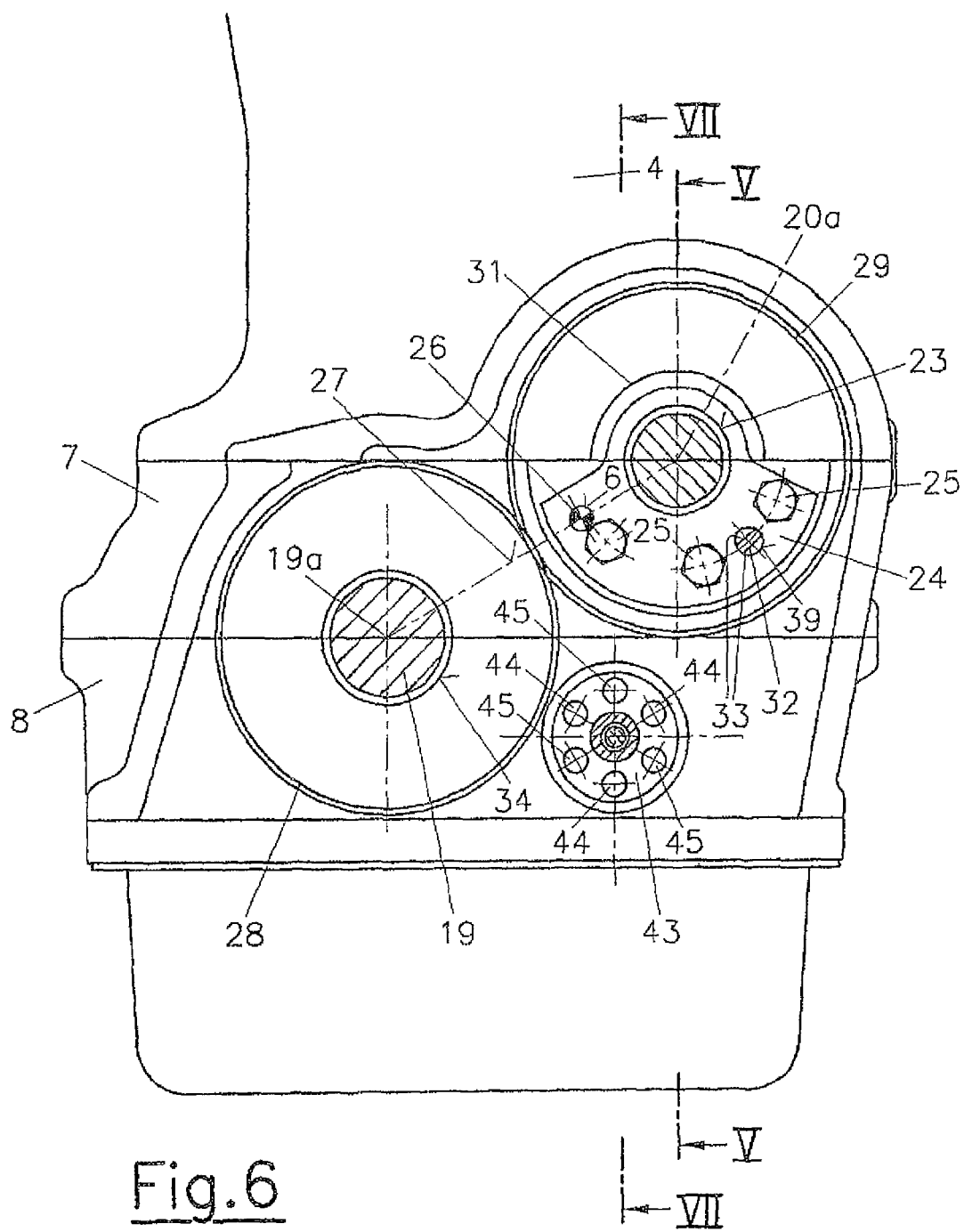
FIG. 6 shows the internal combustion engine in a view along the line VI-VI in FIG. 5.

As is shown in FIG. 1, FIG. 5, and FIG. 6, the mass balancing shaft 20 can be integrated in the first part 7. The position of the mass balancing shaft 20 will be found in such a way that the balance weights 21 of the mass balancing shaft 20 are able to rotate with sufficient distance from the envelope 22 of the connecting rod (not shown in closer detail), wherein the axis 20a of the mass balancing shaft 20 does not necessarily have to lie in the plane ε of the axis 19a of the crankshaft 19. In order to ensure that the machining of the bearing bores 23 can occur independent from the head-block unit 4, the bearing bores 23 are housed in the flanged bushes 24. They are fixed with flange screws 25 in the first part 7. A first pin 26 which is arranged as an alignment pin is arranged on the straight connecting line 27 between the axis 19a of the crankshaft 19 and the axis 20a of the mass balancing shaft 20 at a precisely defined distance from the axis 19a of the crankshaft 19 in the region of the face sides 5 of the first part 7. The first pin 26 is guided in a borehole 6 of the flanged bush 24 and keeps the necessary distance for the engagement of the two gearwheels 28, 29 for driving the mass balancing shaft 20 by the crankshaft 19.

The machining of the area 30 for fixing the flanged bushes 24 in the first part 7 can occur from the outside. A respective recess 31 for accommodating the flanged bushes 24 is provided in the head-block unit 4.

A second pin 32 with two flattened portions in its cross-section is further provided in the region of the face side 5 of the first part 7 in order to ensure parallelism of the mass balancing shaft 20 in relation to the crankshaft 19. The two flattened portions 33 are aligned parallel to the connecting line 27 between the axis 19a of the crankshaft 19 and the axis 20a of the mass balancing shaft 20. The flanged bush 24 comprises a guide opening 39 which corresponds with the second pin 32. As a result, the flanged bush 24 can be pivoted about the first pin 26 without leading to any disadvantages for the tooth engagement of the two gearwheels 28, 29.

In this way, the receiving bores 34 for the main bearings 35 of the crankshaft 19 and the bearing bores 23 in the flanged bushes 24 can be machined independent from the head-block unit 4 in one clamping.

The drive of the mass balancing shaft 20 can also occur with a chain instead of the gearwheels 28, 29.

As is shown in FIG. 5, the mass balancing shaft 20 can also be arranged for driving an injection pump 36. The mass balancing shaft 20 comprises a cam 37 for this purpose which acts upon the drive tappet 38 of the injection pump 36. The position of the cam 37 can be chosen at will and can also be provided in the region of the bearing on the side of the flywheel as an alternative to the symmetrical arrangement as shown in FIG. 5.

Furthermore, an oil pump 40 can also be arranged in the crankcase 10, i.e. either in the first part 7 or in the second part 8.

Figure 7:
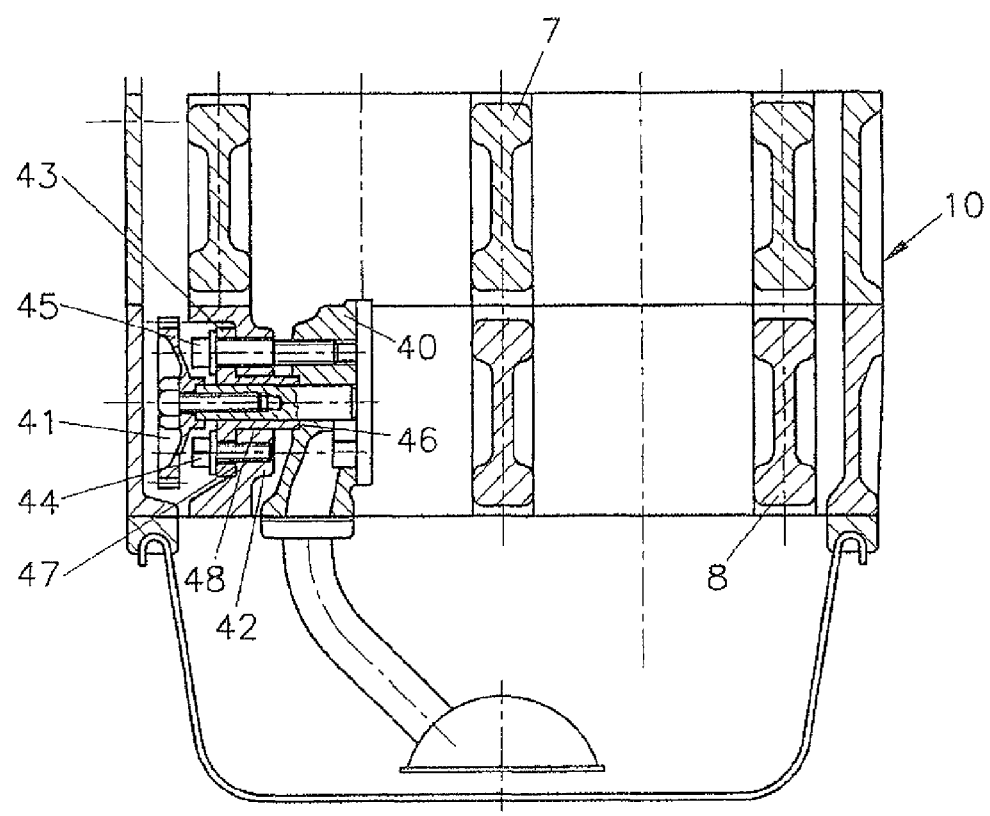
FIG. 7 shows the internal combustion engine in a further sectional view through the crankcase along the line VII-VII in FIG. 6.

FIG. 7 shows an embodiment in which the oil pump 40 is positioned in the second part 8. The drive of the oil pump 40 occurs via the crankshaft 19 by the drive gearwheel 41. For the purpose of fixing the oil pump 40, a flange 43 is inserted into a mounting wall 42 of the second part 8. The flange 43 is fixed by short first screws 44 to the mounting wall 42 of the second part 8. Long second screws 45 pull the oil pump 40 against the face side 46 of the flange 43. As a result, the oil pump 40 is not pressed by internal screws against the second part 8, but is drawn by external second screws 45 against the face surface 46 of the flange 43. The screws 44, 45 for fixing the flange 43 and the oil pump 40 are arranged on the same externally accessible side of the crankcase 10.

The advantage of this arrangement is that only one machining of the clamping surface 47 and the centering borehole 48 for the flange 43 is necessary from the outside in order to install the oil pump 40 in the interior of the crankcase 10. A further advantage is obtained in that the fixing of the oil pump 40 only occurs on the face surface 46 of the centering sleeve of the flange 43 and the oil pump 40 can be larger than the fixing area. As a result, the oil pump 40 will become independent with respect to its size from the dimension of the machining for the centering diameter.

The drive of the oil pump 40 can also occur via a chain (not shown in greater detail) as an alternative to the drive via the drive gearwheel 41.

The invention claimed is:

1. An internal combustion engine, comprising a cylinder head and a cylinder block, with a crankcase being fixed to the cylinder block, and with at least one mass balancing shaft being held in the crankcase, with at least one bearing bore for the mass balancing shaft being formed by a flanged bush which is fixed in the region of a face side of the crankcase, especially screwed onto the same, wherein when seen in the direction of the axis of the crankshaft, a first pin which is arranged in a borehole and arranged as an alignment pin is positioned in a region of a face side of the crankcase on a straight connecting line between an axis of the mass balancing shaft and an axis of the crankshaft, wherein the flange bush can be pivoted about the first pin, with the first pin being arranged in the crankcase and the borehole in the flanged bush.

2. The internal combustion engine according to claim 1, wherein a second pin is arranged in the region of the face side of the crankcase, which second pin comprises two flattened portions which are aligned parallel to the connecting line between the axis of the crankshaft and the axis of the mass balancing shaft, and which second pin is guided in a respective guide opening of a corresponding part, and with the second pin being arranged in the crankcase and the guide opening in the flanged bush.

3. The internal combustion engine according to claim 1, wherein the mass balancing shaft comprises at least one cam for driving an injection pump.

4. The internal combustion engine according to claim 1, wherein the cylinder head and the cylinder block are integrally arranged as a head-block unit.

5. The internal combustion engine according to claim 4, wherein the crankcase consists of a first part which is adjacent to the head-block unit and a second part which is adjacent to the first part, with the first and second part being divided in a plane containing the axis of the crankshaft normal to a cylinder axis.

6. The internal combustion engine according to claim 5, wherein the mass balancing shaft is held in the first part.

* * * * *